US 10,224,777 B2

(12) United States Patent
Murase

(10) Patent No.: US 10,224,777 B2
(45) Date of Patent: Mar. 5, 2019

(54) BRUSHLESS MOTOR WITH WATER STOPPING WALLS CREATING LABYRINTH STRUCTURE

(71) Applicant: ASMO CO., LTD., Kosai, Shizuoka-pref. (JP)

(72) Inventor: Akio Murase, Toyohashi (JP)

(73) Assignee: DENSO CORPORATION, Aichi-Pref. (JP)

( * ) Notice: Subject to any disclaimer, the term of this patent is extended or adjusted under 35 U.S.C. 154(b) by 254 days.

(21) Appl. No.: 15/059,309

(22) Filed: Mar. 3, 2016

(65) Prior Publication Data

US 2016/0268863 A1    Sep. 15, 2016

(30) Foreign Application Priority Data

Mar. 10, 2015  (JP) ................. 2015-047252

(51) Int. Cl.
*H02K 5/10* (2006.01)
*H02K 5/14* (2006.01)
(Continued)

(52) U.S. Cl.
CPC .............. *H02K 5/10* (2013.01); *H02K 3/325* (2013.01); *H02K 5/08* (2013.01); *H02K 5/14* (2013.01);
(Continued)

(58) Field of Classification Search
CPC ............ H02K 5/10; H02K 5/12; H02K 5/124; H02K 2203/12; H02K 2205/09;
(Continued)

(56) References Cited

U.S. PATENT DOCUMENTS 6,954,017 B2 * 10/2005 Takahashi ............. F16C 33/103
310/67 R
8,678,785 B2 * 3/2014 Nogami ................ F04D 29/083
415/174.3
(Continued)

FOREIGN PATENT DOCUMENTS

CN    103095022 A    5/2013
CN    103348570 A    10/2013
(Continued)

OTHER PUBLICATIONS

Office Action dated Dec. 4, 2018, issued by the SIPO in corresponding Chinese Patent Application No. 201610127304.3.

*Primary Examiner* — Bernard Rojas
*Assistant Examiner* — Maged M Almawri
(74) *Attorney, Agent, or Firm* — Solaris Intellectual Property Group, PLLC

(57) ABSTRACT

There is provided a brushless motor including (1) a motor shaft, (2) an insulator that includes a ring-shaped insulating portion covering the ring-shaped unit, (3) a centerpiece that includes a main body section that supports the motor shaft, (4) a first water stopping wall that is formed in a ring shape along the circumferential direction of the motor shaft, and that extends along the axial direction of the motor shaft from the ring-shaped insulating portion toward the main body section, and (5) a second water stopping wall that is formed in a ring shape along the circumferential direction of the motor shaft, that extends out along the axial direction of the motor shaft from the main body section toward the ring-shaped insulating portion, and that, together with the first water stopping wall, configures a labyrinth structure.

5 Claims, 5 Drawing Sheets

(51) Int. Cl.
*H02K 5/08* (2006.01)
*H02K 21/22* (2006.01)
*H02K 3/32* (2006.01)

(52) U.S. Cl.
CPC ......... *H02K 21/22* (2013.01); *H02K 2203/12* (2013.01); *H02K 2205/09* (2013.01)

(58) Field of Classification Search
CPC .......... H02K 5/14; H02K 5/143; H02K 5/148; H02K 5/00; H02K 5/02; H02K 5/04; H02K 5/08; H02K 5/132; H02K 5/145; H02K 5/146; H02K 3/325; H02K 21/22
USPC ............................... 310/88, 89, 90, 239, 245
See application file for complete search history.

(56) References Cited

U.S. PATENT DOCUMENTS

| | | | |
|---|---|---|---|
| 9,006,944 B2* | 4/2015 | Horng | H02K 1/187 |
| | | | 310/67 R |
| 9,231,448 B2* | 1/2016 | Horng | H02K 5/1675 |
| 2014/0154108 A1* | 6/2014 | Hirosawa | F04D 25/062 |
| | | | 417/353 |

FOREIGN PATENT DOCUMENTS

| | | |
|---|---|---|
| JP | H09-261915 A | 10/1997 |
| JP | 2007-53844 A | 3/2007 |
| JP | 2014-36525 A | 2/2014 |

\* cited by examiner

BRUSHLESS MOTOR WITH WATER STOPPING WALLS CREATING LABYRINTH STRUCTURE

CROSS-REFERENCE TO RELATED APPLICATION

This application claims priority under 35 USC 119 from Japanese Patent Application No. 2015-047252, filed on Mar. 10, 2015, the disclosure of which is incorporated by reference herein.

BACKGROUND

Technical Field

The present disclosure relates to a brushless motor.

Related Art

A conventional outer rotor type brushless motor provided with a motor shaft, a rotor housing rotatably supported on the motor shaft through a shaft bearing, and a stator housed inside the rotor housing is known (for example, see Japanese Patent Application Laid-Open (JP-A) No. 2014-36525).

In such brushless motors, the performance of the shaft bearing is liable to decrease when exposed to water due to water droplets having penetrated through to the inside the rotor housing. A brushless motor provided with a labyrinth structure has therefore been proposed for suppressing the shaft bearing from being exposed to water (for example, see JP-A No. 2007-53844).

Amongst brush motors of this sort, there are also motors employed as vehicle fan motors (for example, see JP-A No. H09-261915). This vehicle fan motor is fixed to the vehicle body by a shroud. A fixing portion provided at a central portion of a fan is fixed to a rotor housing in this fan motor, and the fan rotates together with the rotor housing.

However, in the vehicle fan motor described above, penetration pathways for water droplets are liable to arise at gaps in an outer peripheral portion of the fan motor, namely, at gaps formed between the rotor housing, the fixing portion of the fan, and the shroud. Thus, a labyrinth structure configured by the rotor housing, the fixing portion of the fan, and the shroud could conceivably be provided at the outer peripheral portion of the fan motor in order to prevent penetration by water.

However, in such cases, flow of cooling air that cools a winding coil section wound around teeth of the stator and that is expelled toward the radial direction outside of the fan motor is liable to be hindered by the labyrinth structure. Accordingly, it is desirable to secure cooling of the winding coil section while suppressing the shaft bearing from being exposed to water.

SUMMARY

The present disclosure provides a brushless motor capable of securing cooling of the winding coil section while suppressing the shaft bearing from being exposed to water.

A first aspect of the present disclosure is a brushless motor including: a motor shaft; a rotor housing including a circular cylinder shaped shaft bearing housing section provided at the radial direction outside of the motor shaft, and an outer cylinder section formed at the radial direction outside of the shaft bearing housing section; a shaft bearing that is housed in the shaft bearing housing section, and that is assembled to the motor shaft; a stator core that includes a ring-shaped unit provided at the radial direction outside of the shaft bearing housing section, and plural teeth formed in a radiating pattern at the periphery of the ring-shaped unit, and that is housed inside the outer cylinder section; an insulator that includes a ring-shaped insulating portion covering the ring-shaped unit, and plural teeth insulating portions respectively covering the plural teeth; plural winding coil portions wound around the teeth and over the teeth insulating portions; a centerpiece that includes a main body section disposed facing an opening of the outer cylinder section, and that supports the motor shaft and the stator core; a first water stopping wall that is formed in a ring shape along the circumferential direction of the motor shaft, and that extends along the axial direction of the motor shaft from the ring-shaped insulating portion toward the main body section; and a second water stopping wall that is formed in a ring shape along the circumferential direction of the motor shaft, that extends out along the axial direction of the motor shaft from the main body section toward the ring-shaped insulating portion, and that, together with the first water stopping wall, configures a labyrinth structure positioned at the radial direction inside of the plural winding coil portions.

According to the brushless motor of the first aspect, a labyrinth structure is configured by the first water stopping wall and the second water stopping wall that are formed in ring shapes along the circumferential direction of the motor shaft. In the labyrinth structure, the first water stopping wall extends out along the axial direction of the motor shaft from the ring-shaped insulating portion toward the main body section, and the second water stopping wall extends out along the axial direction of the motor shaft from the main body section toward the ring-shaped insulating portion.

Accordingly, even in a case in which, for example, a water droplet that has entered from the gap between an opening circumferential edge portion of the rotor housing and the main body section of the centerpiece approaches the shaft bearing side through between the stator core and the main body section, penetration by the water droplet can still be prevented by the labyrinth structure described above. The shaft bearing can thereby be suppressed from being exposed to water.

Moreover, the labyrinth structure is positioned at the radial direction inside of the plural winding coil portions that are arranged in a ring shape. Accordingly, since the labyrinth structure is not disposed on the pathway of the flow of cooling wind that cools the winding coil sections and that is expelled toward the radial direction outside of the brushless motor, the flow of the cooling wind can be suppressed from being hindered by the labyrinth structure.

A second aspect of the present disclosure is the brushless motor of the first aspect, wherein the first water stopping wall is disposed at the radial direction inside of the second water stopping wall.

According to the brushless motor of the second aspect, by disposing the first water stopping wall at the radial direction inside of the second water stopping wall, the first water stopping wall is disposed at a closer position to the outer peripheral face of the motor shaft (the outer peripheral face of the motor shaft along which water droplets travel) that is liable to become the pathway by which water droplets penetrate to the shaft bearing. Accordingly, the shaft bearing can be more effectively suppressed from being exposed to water by the first water stopping wall.

A third aspect of the present disclosure is the brushless motor of the second aspect, wherein an extending portion is formed at the ring-shaped insulating portion so as to extend out toward the radial direction outside of the first water stopping wall, and a leading end portion of the second water stopping wall faces the extending portion along the axial direction of the motor shaft.

According to the brushless motor of the third aspect, in the labyrinth structure described above, due to the extending portion formed at the ring-shaped insulating portion and the leading end portion of the second water stopping wall facing each other along the axial direction of the motor shaft, water droplets cannot easily enter the gap between the extending portion and the leading end portion of the second water stopping wall. The water stopping capability of the labyrinth structure can thereby be improved.

A fourth aspect of the present disclosure is the brushless motor of the third aspect, wherein a radial direction outside end portion of the extending portion projects out further to the radial direction outside of the extending portion than the leading end portion of the second water stopping wall.

According to the brushless motor of the fourth aspect, a radial direction outside end portion of the extending portion projects further toward the radial direction outside of the extending portion than the leading end portion of the second water stopping wall. Accordingly, since water droplets can be more effectively hindered at the portion of the extending portion projecting further toward the radial direction outside than the second water stopping wall, this can also improve the water stopping capability of the labyrinth structure.

A fifth aspect of the present disclosure is the brushless motor of any one of the first aspect to the fourth aspect, further including: a third water stopping wall that is formed in a ring shape along the circumferential direction of the motor shaft, and that extends out along the axial direction of the motor shaft from the ring-shaped insulating portion toward the main body section; and a fourth water stopping wall that is formed in a ring shape along the circumferential direction of the motor shaft, and that extends out along the axial direction of the motor shaft from the main body section toward the ring-shaped insulating portion, wherein, the first water stopping wall and the second water stopping wall configure an inner labyrinth structure as the labyrinth structure, and the third water stopping wall and the fourth water stopping wall configure an outer labyrinth structure positioned at the radial direction inside of plural winding coil portions and at the radial direction outside of the inner labyrinth structure.

According to the brushless motor of the fifth aspect, in addition to the inner labyrinth structure, the outer labyrinth structure is also provided at the radial direction inside of the plural winding coil sections. Accordingly, the shaft bearings can be even more effectively suppressed from being exposed to water by this two-layer labyrinth structure.

Similarly to the inner labyrinth structure described above, the outer labyrinth structure is also positioned at the radial direction inside of the plural winding coil sections arranged in a ring shape. Accordingly, since the outer labyrinth structure is not disposed on the pathway of the flow of cooling wind that cools the winding coil sections and that is expelled to toward the radial direction outside of the brushless motor, the flow of the cooling wind can be suppressed from being hindered by the outer labyrinth structure.

A sixth aspect of the present disclosure is the brushless motor of the fifth aspect, wherein the leading end side of the first water stopping wall overlaps along the axial direction of the motor shaft with the leading end side of the second water stopping wall, and the leading end side of the third water stopping wall overlaps along the axial direction of the motor shaft with the leading end side of the fourth water stopping wall.

According to the brushless motor of the sixth aspect, the leading end side of the first water stopping wall overlaps with the leading end side of the second water stopping wall along the axial direction of the motor shaft. The water stopping capability of the inner labyrinth structure can thereby be further improved since the flow path inside the inner labyrinth structure bends and the flow path length is increased.

Similarly, the leading end side of the third water stopping wall overlaps with the leading end side of the fourth water stopping wall of the motor shaft. The water stopping capability of the outer labyrinth structure can thereby be further improved since the flow path inside the outer labyrinth structure bends and the flow path length is increased.

BRIEF DESCRIPTION OF THE DRAWINGS

Exemplary embodiments of the present disclosure will be described in detail based in the following figures, wherein.

DETAILED DESCRIPTION

Explanation follows regarding an exemplary embodiment of the present disclosure based on the drawings.

Figure 1:
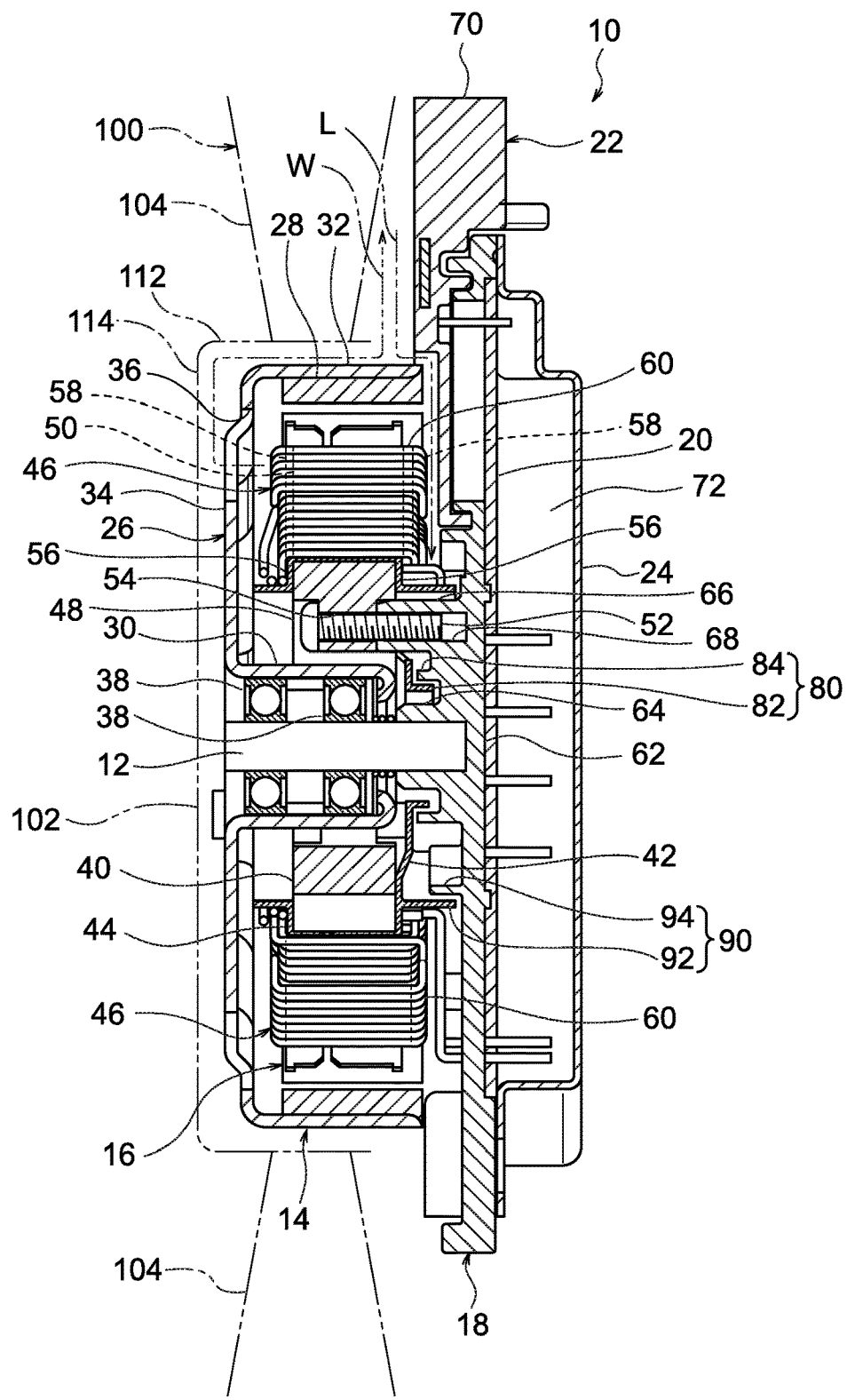
FIG. 1 is a vertical cross-section of a brushless motor according to an exemplary embodiment of the present disclosure.

As illustrated in FIG. 1, a brushless motor 10 according to the exemplary embodiment of the present disclosure includes a motor shaft 12, a rotor 14, a stator 16, a centerpiece 18, a circuit board 20, a connecting member 22, and a board case 24.

The rotor 14 includes a rotor housing 26 and a rotor magnet 28. The rotor housing 26 includes a circular cylinder shaped shaft bearing housing section 30 provided at the outer radial direction side of the motor shaft 12, and an bottomed-cylinder shaped outer cylinder section 32 formed at the radial direction outside of the shaft bearing housing section 30. The rotor magnet 28 is provided at an inner peripheral face of the outer cylinder section 32.

An opening is formed at one axial direction side of the outer cylinder section 32, and a bottom wall portion 34 is formed at the other radial direction side of the outer cylinder section 32. The shaft bearing housing section 30 described above extends out from a central portion of the bottom wall portion 34 toward the centerpiece 18 side. Plural vent holes 36 are formed in the bottom wall portion 34.

A pair of shaft bearings 38 are housed in the shaft bearing housing section 30, and the motor shaft 12 is assembled to the pair of shaft bearings 38. Both axial direction sides of the shaft bearing housing section 30 are open, and one end of the motor shaft 12 projects out from the shaft bearing housing section 30 toward the centerpiece 18 passing through the opening in one axial direction side of the shaft bearing housing section 30.

The stator 16 includes a stator core 40, a pair of insulators 42, 44, and plural windings 46. The stator core 40 includes a ring-shaped unit 48 provided at the axial direction outside of the shaft bearing housing section 30, and plural teeth 50 formed in a radiating pattern at the periphery of the ring-shaped unit 48. The stator core 40 is housed inside the outer cylinder section 32, and is disposed between the shaft bearing housing section 30 and the rotor magnet 28 along the radial direction. A penetration hole 54, into which a screw 52 is inserted, is formed in the ring-shaped unit 48 penetrating along the axial direction of the motor shaft 12.

Figure 2:
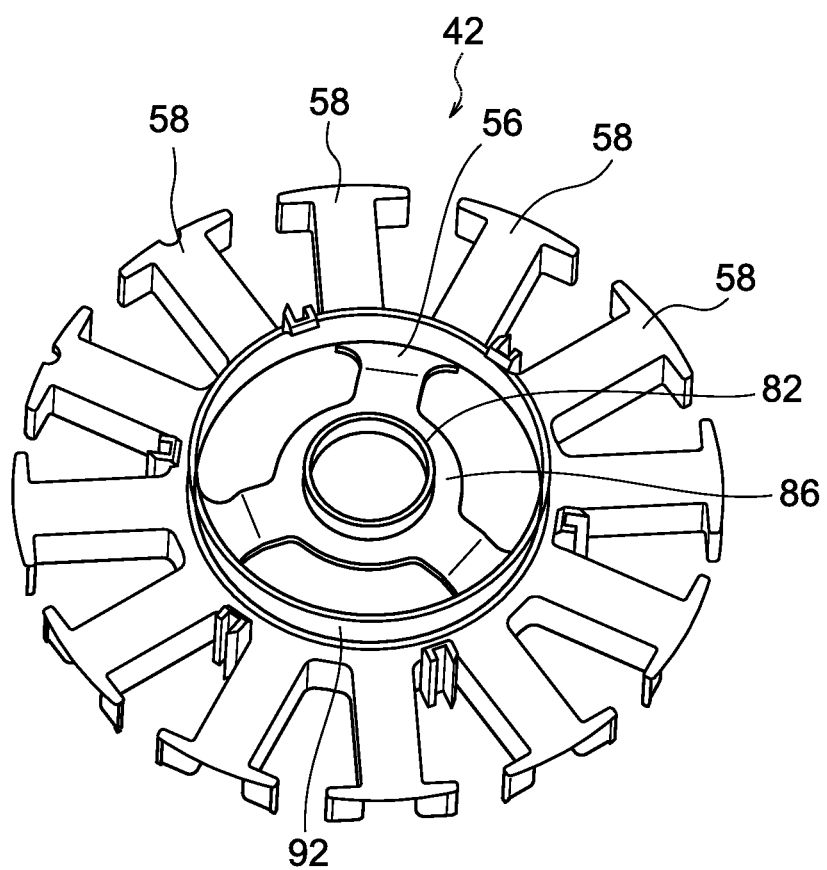
FIG. 2 is a perspective view of one of the insulators illustrated in FIG. 1.

The pair of insulators 42, 44 are divided along the axial direction of the stator core 40, and are fixed to the stator core 40 from the both axial direction sides of the stator core 40. The pair of insulators 42, 44 each include a ring-shaped insulating portion 56 that covers the ring-shaped unit 48, and plural teeth insulating portions 58 that cover the respective plural teeth 50 (see FIG. 2, and FIG. 3).

Out of the pair of insulators 42, 44, the insulator 42 that is disposed at one axial direction side (namely, the centerpiece 18 side) of the stator core 40 is an example of an "insulator" of the present disclosure.

The plural windings 46 include plural winding coil sections 60 wound around the teeth 50 and over the teeth insulating portions 58. The winding coil sections 60 may be wound onto one of the teeth 50 by concentrated winding, or may be wound across plural of the teeth 50 by distributed winding.

The centerpiece 18 includes a flat plate shaped main body section 62. The main body section 62 is disposed facing the opening of the outer cylinder section 32. A shaft supporting section 64, having a concave shape open at the shaft bearing housing section 30 side, is formed at a central portion of the main body section 62, and the motor shaft 12 is pushed into the shaft supporting section 64 so as to be supported thereon. In the main body section 62, a boss 66 projecting toward the stator 16 side along the axial direction of the motor shaft 12 is formed further to the radial direction outside than the shaft supporting section 64.

Plural of the bosses 66 are provided at intervals around the circumferential direction of the motor shaft 12. A screw hole 68, open at the stator core 40 side, is formed at each of the bosses 66. The screw hole 68 is formed at a position corresponding to the penetration hole 54 formed at the ring-shaped unit 48 of the stator core 40 described above. Having been inserted through the penetration hole 54, the screw 52 is screwed into the screw hole 68 such that the stator core 40 is fixed and supported to the main body section 62.

The circuit board 20 is fixed to the side of the main body section 62 opposite to the side of the stator core 40. An electronic circuit is formed on the circuit board 20 for switching conduction to the plural winding coil sections 60 described above. The connecting member 22 is provided at one side of the main body section 62. A connecting portion 70 is provided at the connecting member 22, and a connection terminal provided at the connecting portion 70 is electrically connected to the electronic circuit formed on the circuit board 20.

The board case 24 is formed with a flattened box shape, and is assembled to the main body section 62 at the side of the main body section 62 opposite to the side of the stator core 40. A housing space 72 is formed between the board case 24 and the main body section 62, and the circuit board 20 is housed in the housing space 72.

The brushless motor 10 is, for example, suitably employed as a vehicle fan motor, and the motor shaft 12 is fixed to the vehicle body such that the motor shaft 12 is disposed along a horizontal direction.

A fan 100 includes a fixing portion 102 provided at a central portion of the fan 100, and plural blades 104 provided at the periphery of the fixing portion 102. Similarly to the rotor housing 26, the fixing portion 102 includes an outer cylinder section 112 and a bottom wall portion 114, and is fixed to the rotor housing 26 so as to cover the rotor housing 26.

In the brushless motor 10, in a case in which conduction to the plural winding coil sections 60 is switched by the electronic circuit formed on the circuit board 20, a rotating magnetic field is generated by the stator 16, and the rotor 14 is rotated by the attraction force and repulsion force operating between the rotating magnetic field and the rotor magnet 28.

Moreover, in a case in which the fan 100 rotates together with the rotor 14, a flow of cooling wind W that cools the winding coil sections 60 through slots formed between the plural teeth 50 is generated. The cooling wind W is expelled toward the outside of the rotor housing 26 through the vent holes 36 formed at the bottom wall portion 34, and also expelled toward the radial direction outside of the brushless motor 10 between the bottom wall portions 34, 114, and between the outer cylinder sections 32, outer cylinder section 112, of the fixing portion 102 and rotor housing 26.

Next, explanation follows regarding an inner labyrinth structure 80 and an outer labyrinth structure 90 provided at the brushless motor 10 according to the present disclosure.

Figure 3:
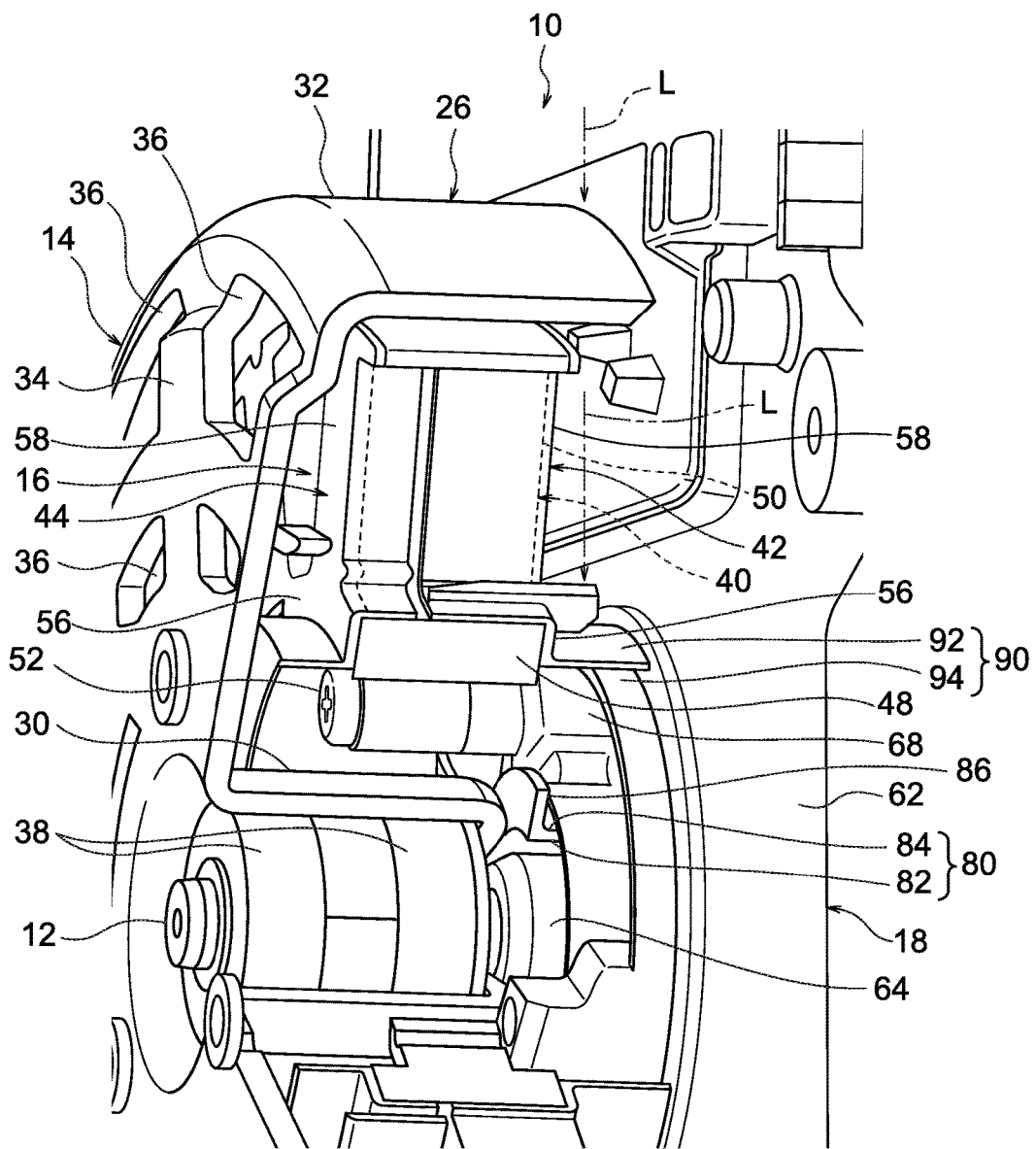
FIG. 3 is a perspective view of a peripheral portion of the inner labyrinth structure and the outer labyrinth structure illustrated in FIG. 1.
Figure 4:
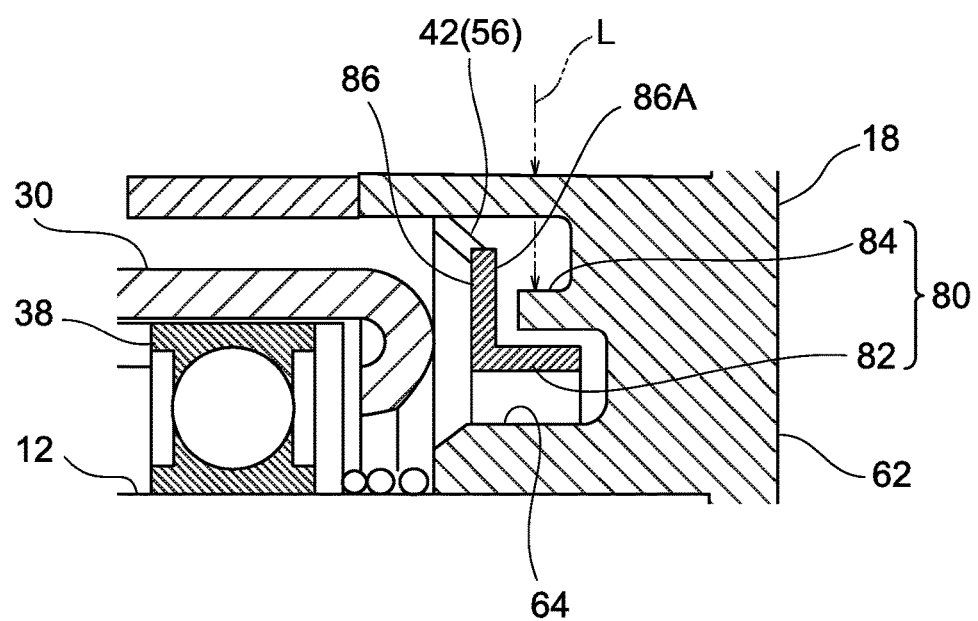
FIG. 4 is a vertical cross-section of the inner labyrinth structure illustrated in FIG. 3.
Figure 5:
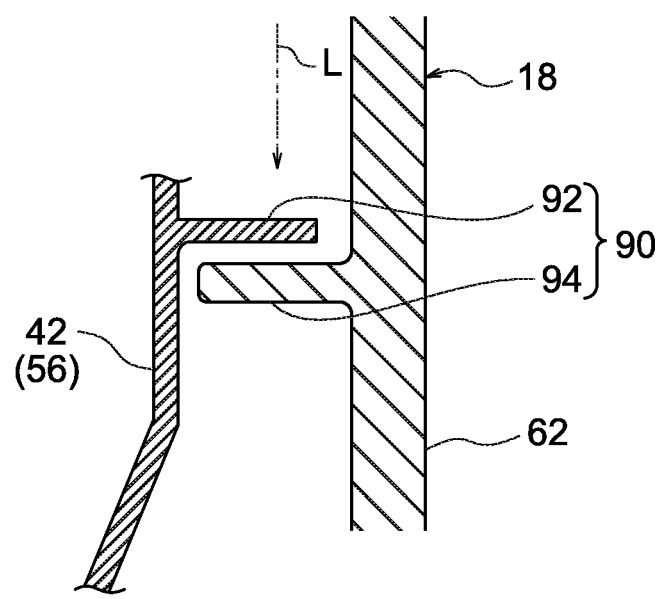
FIG. 5 is a vertical cross-section of the outer labyrinth structure illustrated in FIG. 4.

As illustrated in FIG. 3 to FIG. 5, the inner labyrinth structure 80 and the outer labyrinth structure 90 are provided at the brushless motor 10. As illustrated in FIG. 3 and FIG. 4, the inner labyrinth structure 80 is configured by a first water stopping wall 82 and a second water stopping wall 84 that are formed in a ring shape along the circumferential direction of the motor shaft 12.

The first water stopping wall 82 extends out along the axial direction of the motor shaft 12 from the ring-shaped insulating portion 56 formed at one of the pair of insulators 42, toward the main body section 62. On the other hand, the second water stopping wall 84 extends out along the axial direction of the motor shaft 12 from the main body section 62 (a peripheral portion of the shaft supporting section 64) toward the ring-shaped insulating portion 56.

The first water stopping wall 82 is disposed at the radial direction inside of the second water stopping wall 84, and the leading end side of the first water stopping wall 82 and the leading end side of the second water stopping wall 84 overlap along the axial direction of the motor shaft 12. A gap is secured along the radial direction between the first water stopping wall 82 and the second water stopping wall 84.

A leading end portion of the first water stopping wall 82 faces the main body section 62 (the peripheral portion of the shaft supporting section 64) along the axial direction of the motor shaft 12. Moreover, an extending portion 86 that extends out toward the radial direction outside of the first water stopping wall 82 is formed at the ring-shaped insulating portion 56, and the leading end portion of the second water stopping wall 84 faces the extending portion 86 along the axial direction of the motor shaft 12.

As illustrated in FIG. 4, a radial direction outside end portion 86A of the extending portion 86 projects further to the radial direction outside of the extending portion 86 than the leading end portion of the second water stopping wall 84. Respective gaps are secured between the leading end portion of the first water stopping wall 82 and the main body section 62, and between the leading end portion of the second water stopping wall 84 and the extending portion 86.

As illustrated in FIG. 1, the inner labyrinth structure 80 formed by the first water stopping wall 82 and the second water stopping wall 84 is positioned at the radial direction inside of the plural winding coil sections 60, and more specifically, is positioned between the shaft bearing housing section 30 and the main body section 62 (the peripheral portion of the shaft supporting section 64) along the axial direction. The inner labyrinth structure 80 is an example of a labyrinth structure of the present disclosure.

As illustrated in FIG. 3 and FIG. 5, similarly to the first water stopping wall 82 and the second water stopping wall 84 of the inner labyrinth structure 80 described above, the outer labyrinth structure 90 is configured by a third water stopping wall 92 and a fourth water stopping wall 94 formed in a ring shape along the circumferential direction of the motor shaft 12. The third water stopping wall 92 and the fourth water stopping wall 94 are positioned at the radial direction outside of the first water stopping wall 82 and the second water stopping wall 84.

The third water stopping wall 92 extends out along the axial direction of the motor shaft 12 from the ring-shaped insulating portion 56 formed at one of the pair of insulators 42, toward the main body section 62. On the other hand, the fourth water stopping wall 94 extends out along the axial direction of the motor shaft 12 from the main body section 62, toward the ring-shaped insulating portion 56.

The third water stopping wall 92 is disposed at the radial direction outside of the fourth water stopping wall 94, and the leading end side of the third water stopping wall 92 and the leading end side of the fourth water stopping wall 94 overlap in the axial direction of the motor shaft 12. A gap is secured between the third water stopping wall 92 and the fourth water stopping wall 94 along the radial direction.

The leading end portion of the third water stopping wall 92 faces the main body section 62 along the axial direction of the motor shaft 12. The leading end portion of the fourth water stopping wall 94 faces the ring-shaped insulating portion 56 along the axial direction of the motor shaft 12. Respective spaces are secured between the leading end portion of the third water stopping wall 92 and the main body section 62, and between the leading end portion of the fourth water stopping wall 94 and the ring-shaped insulating portion 56.

As illustrated in FIG. 1, the outer labyrinth structure 90 formed by the third water stopping wall 92 and the fourth water stopping wall 94 is at the radial direction inside of the plural winding coil sections 60, and is positioned at the radial direction outside of the inner labyrinth structure 80.

Next, explanation follows regarding operation of the exemplary embodiment of the present disclosure.

As described in detail above, in the brushless motor 10 according to the exemplary embodiment of the present disclosure, the inner labyrinth structure 80 is configured by the first water stopping wall 82 and the second water stopping wall 84 that are formed in a ring shape along the circumferential direction of the motor shaft 12. In the inner labyrinth structure 80, the first water stopping wall 82 extends out along the axial direction of the motor shaft 12 from the ring-shaped insulating portion 56 toward the main body section 62, and the second water stopping wall 84 extends out along the axial direction of the motor shaft 12 from the main body section 62 toward the ring-shaped insulating portion 56.

Accordingly, even in a case in which, for example, a water droplet L that has entered from the gap between an opening circumferential edge portion of the rotor housing 26 and the main body section 62 of the centerpiece 18 approaches the shaft bearing 38 side through between the stator core 40 and the main body section 62, penetration by the water droplet L can still be prevented by the inner labyrinth structure 80 described above. The shaft bearings 38 can thereby be suppressed from being exposed to water.

Moreover, the inner labyrinth structure 80 is positioned at the radial direction inside of the plural winding coil sections 60 arranged in a ring shape. Accordingly, since the inner labyrinth structure 80 is not disposed on the pathway of the flow of the cooling wind W that cools the winding coil sections 60 and that is expelled toward the radial direction outside of the brushless motor 10, the flow of the cooling wind W can be suppressed from being hindered by the inner labyrinth structure 80.

In this manner, the brushless motor 10 according to the exemplary embodiment of the present disclosure can secure cooling of the winding coil sections 60 while suppressing the shaft bearings 38 from being exposed to water.

Moreover, by disposing the first water stopping wall 82 at the radial direction inside of the second water stopping wall 84, the first water stopping wall 82 is disposed at a closer position to the outer peripheral face of the motor shaft 12 (the outer peripheral face of the motor shaft 12 along which the water droplet L travels) that is liable to become the pathway by which the water droplet L penetrates to the pair of shaft bearings 38. Accordingly, shaft bearings 38 can be more effectively suppressed from being exposed to water by the first water stopping wall 82.

Moreover, in the inner labyrinth structure 80 described above, due to the extending portion 86 formed at the ring-shaped insulating portion 56 and the leading end portion of the second water stopping wall 84 facing each other along the axial direction of the motor shaft 12, the water droplet L cannot easily enter the gap between the extending portion 86 and the leading end portion of the second water stopping wall 84. The water stopping capability of the inner labyrinth structure 80 can thereby be improved.

As illustrated in FIG. 4, a radial direction outside end portion 86A of the extending portion 86 projects further toward the radial direction outside of the extending portion 86 than the leading end portion of the second water stopping wall 84. Accordingly, since the water droplet L can be more effectively hindered at the portion of the extending portion 86 projecting further toward the radial direction outside than the second water stopping wall 84, this can also improve the water stopping capability of the inner labyrinth structure 80.

As illustrated in FIG. 1, in addition to the inner labyrinth structure 80, the outer labyrinth structure 90 is also provided at the radial direction inside of the plural winding coil sections 60. Accordingly, the shaft bearings 38 can be even more effectively suppressed from being exposed to water by this two-layer labyrinth structure.

Similarly to the inner labyrinth structure 80 described above, the outer labyrinth structure 90 is also positioned at the radial direction inside of the plural winding coil sections 60 arranged in a ring shape. Accordingly, since the outer labyrinth structure 90 is not disposed on the pathway of the flow of the cooling wind W that cools the winding coil sections 60 and that is expelled to toward the radial direction outside of the brushless motor 10, the flow of the cooling wind W can be suppressed from being hindered by the outer labyrinth structure 90.

As illustrated in FIG. 4, the leading end side of the first water stopping wall 82 overlaps with the leading end side of the second water stopping wall 84 along the axial direction of the motor shaft 12. The water stopping capability of the inner labyrinth structure 80 can thereby be further improved since the flow path inside the inner labyrinth structure 80 bends and the flow path length is increased.

Similarly, as illustrated in FIG. 5, the leading end side of the third water stopping wall 92 overlaps with the leading end side of the fourth water stopping wall 94 along the axial direction of the motor shaft 12. The water stopping capability of the outer labyrinth structure 90 can thereby be further improved since the flow path inside the outer labyrinth structure 90 bends and the flow path length is increased.

Next, explanation follows regarding a modified example of the exemplary embodiment of the present disclosure.

Although the brushless motor 10 of the exemplary embodiment of the present disclosure described above is more preferably employed as a vehicle fan motor, the brushless motor 10 may also be employed for applications other than vehicle fan motors.

Moreover, although the brushless motor 10 more preferably includes the outer labyrinth structure 90 in addition to the inner labyrinth structure 80, the outer labyrinth structure 90 may be omitted.

Although the first water stopping wall 82 is more preferably disposed at the radial direction inside of the second water stopping wall 84 in the inner labyrinth structure 80, the first water stopping wall 82 may be disposed at the radial direction outside of the second water stopping wall 84.

Although the third water stopping wall 92 is disposed at the radial direction outside of the fourth water stopping wall 94 in the outer labyrinth structure 90, the third water stopping wall 92 may be disposed at the radial direction inside of the fourth water stopping wall 94.

Although explanation has been given regarding an exemplary embodiment of the present disclosure above, the present disclosure is not limited to the above description, and it is obvious that various modifications can be implemented outside of this description within a range not departing form the spirit thereof.

What is claimed is:

1. A brushless motor comprising:
    a motor shaft;
    a rotor housing including a circular cylinder-shaped shaft bearing housing section provided at the radial direction outside of the motor shaft, and an outer cylinder section formed at the radial direction outside of the shaft bearing housing section;
    a shaft bearing that is housed in the shaft bearing housing section, and that is assembled to the motor shaft;
    a stator core that includes a ring-shaped unit provided at the radial direction outside of the shaft bearing housing section, and a plurality of teeth formed in a radiating pattern at the periphery of the ring-shaped unit, and that is housed inside the outer cylinder section;
    an insulator that includes a ring-shaped insulating portion covering the ring-shaped unit, and a plurality of teeth insulating portions respectively covering the plurality of teeth;
    a plurality of winding coil portions wound around the teeth and over the teeth insulating portions;
    a centerpiece that includes a main body section disposed facing an opening of the outer cylinder section, and that supports the motor shaft and the stator core;
    a first water stopping wall that is formed in a ring shape along the circumferential direction of the motor shaft, and that extends along an axial direction of the motor shaft from the ring-shaped insulating portion toward the main body section;
    a second water stopping wall that is formed in a ring shape along the circumferential direction of the motor shaft, that extends out along the axial direction of the motor shaft from the main body section toward the ring-shaped insulating portion, and that, together with the first water stopping wall, configures a labyrinth structure positioned at a radial direction inside of the plurality of winding coil portions;
    a third water stopping wall that is formed in a ring shape along the circumferential direction of the motor shaft, and that extends out along the axial direction of the motor shaft from the ring-shaped insulating portion toward the main body section; and
    a fourth water stopping wall that is formed in a ring shape along the circumferential direction of the motor shaft, and that extends out along the axial direction of the motor shaft from the main body section toward the ring-shaped insulating portion, wherein:
    the first water stopping wall and the second water stopping wall configure an inner labyrinth structure as the labyrinth structure,
    the third water stopping wall and the fourth water stopping wall configure an outer labyrinth structure positioned at the radial direction inside of the plurality of winding coil portions and at a radial direction outside of the inner labyrinth structure, and
    portions of the rotor housing run substantially parallel to the center piece, and the inner labyrinth structure and the outer labyrinth structure are each disposed closer to the center piece than to the portions of the rotor housing that run substantially parallel to the center piece.

2. The brushless motor of claim 1, wherein:
    the leading end side of the first water stopping wall overlaps along the axial direction of the motor shaft with the leading end side of the second water stopping wall; and
    the leading end side of the third water stopping wall overlaps along the axial direction of the motor shaft with the leading end side of the fourth water stopping wall.

3. The brushless motor of claim 1, wherein the first water stopping wall is disposed at a radial direction inside of the second water stopping wall.

4. The brushless motor of claim 3, wherein:
    an extending portion is formed at the ring-shaped insulating portion so as to extend out toward a radial direction outside of the first water stopping wall; and
    a leading end portion of the second water stopping wall faces the extending portion along the axial direction of the motor shaft.

5. The brushless motor of claim 4, wherein a radial direction outside end portion of the extending portion projects out further to a radial direction outside of the extending portion than the leading end portion of the second water stopping wall.

\* \* \* \* \*